(12) United States Patent
Foiret

(10) Patent No.: US 10,054,002 B2
(45) Date of Patent: Aug. 21, 2018

(54) METHOD FOR ASSISTING WITH THE DETECTION OF DAMAGE TO A TURBOJET DUCT

(71) Applicant: SAFRAN AIRCRAFT ENGINES, Paris (FR)

(72) Inventor: Guilhem Alcide Auguste Foiret, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/318,160

(22) PCT Filed: Jun. 10, 2015

(86) PCT No.: PCT/FR2015/051531
§ 371 (c)(1),
(2) Date: Dec. 12, 2016

(87) PCT Pub. No.: WO2015/189521
PCT Pub. Date: Dec. 17, 2015

(65) Prior Publication Data
US 2017/0107847 A1    Apr. 20, 2017

(30) Foreign Application Priority Data

Jun. 12, 2014  (FR) ..................... 14 55357

(51) Int. Cl.
*F01D 17/00*      (2006.01)
*F01D 17/08*      (2006.01)

(52) U.S. Cl.
CPC .......... *F01D 17/08* (2013.01); *F05D 2260/80* (2013.01); *F05D 2270/301* (2013.01)

(58) Field of Classification Search
None
See application file for complete search history.

(56) References Cited

U.S. PATENT DOCUMENTS 7,065,953 B1 * 6/2006 Kopko ................... F02C 7/057
60/39.3
2004/0154385 A1 * 8/2004 Acker .................... B64C 27/14
73/112.01

(Continued)

OTHER PUBLICATIONS

International Search Report as issued in International Patent Application No. PCT/FR2015/051531, dated May 20, 2016.

(Continued)

*Primary Examiner* — James M McPherson
(74) *Attorney, Agent, or Firm* — Pillsbury Winthrop Shaw Pittman LLP

(57) ABSTRACT

A method for assisting with the detection of damage to a duct, the duct being designed such as to convey a pressurized air flow collected at the outlet of a high pressure compressor of a turbine engine to a first pressure sensor and a second pressure sensor of a computer, the method including: (A) measuring a first air pressure at the first pressure sensor; (B) measuring a second air pressure at the second pressure sensor; (C) determining a theoretical pressure of the air flow at the outlet of the high-pressure compressor; (D) performing a first test regarding the difference between the first value and the theoretical pressure; (E) performing a second test regarding the difference between the second value and the theoretical pressure; and performing a final test, which is positive if the first difference test and the second difference test are positive, and negative otherwise.

8 Claims, 1 Drawing Sheet

(56) References Cited

U.S. PATENT DOCUMENTS

| | | |
|---|---|---|
| 2007/0089499 A1 | 4/2007 | Muramatsu et al. |
| 2007/0118270 A1 | 5/2007 | Wiseman et al. |
| 2010/0158068 A1* | 6/2010 | Monteiro ............... B64D 13/00 |
| | | 374/4 |
| 2011/0046863 A1 | 2/2011 | Tezuka |

OTHER PUBLICATIONS

International Preliminary Report on Patentability and the Written Opinion of the International Searching Authority as issued in International Application No. PCT/FR2015/051531, dated Dec. 15, 2016.

* cited by examiner

METHOD FOR ASSISTING WITH THE DETECTION OF DAMAGE TO A TURBOJET DUCT

CROSS-REFERENCE TO RELATED APPLICATIONS

This is the U.S. National Stage of PCT/FR2015/051531, filed Jun. 10, 2015, which in turn claims priority to French Application No. 1455357, filed Jun. 12, 2014, the entire contents of all applications are incorporated herein by reference in their entireties.

TECHNICAL DOMAIN OF THE INVENTION

The invention belongs to the general domain of turbojets. It more particularly applies to a method for assisting with the detection of damage to a duct in a turbojet.

TECHNOLOGICAL BACKGROUND OF THE INVENTION

In a turbojet, inlet air is compressed in a compressor before it is mixed with fuel and burned in a combustion chamber. Hot gases produced in the chamber then drive one or several downstream turbines and are then ejected. The turbojet also comprises a computer performing power regulation and general electronic management functions: for example, the computer manages the fuel flow, the condition of thrust bearings, discharge valves and systems for fixing turbojet guide vanes.

The compressor is generally separated into two parts: a low pressure (LP) compressor followed by a high pressure (HP) compressor. Moreover, each of these two compressors is generally composed of several stages, the last stage of the HP compressor is the stage directly followed by the combustion chamber. Since the role of the compressor is to compress air to optimise the speed, pressure and temperature at the inlet to the combustion chamber, it is vital to monitor the static pressure at the outlet from the final stage of the HP compressor. This measurement is used for control of the turbojet and fuel proportioning.

FIG. 1 diagrammatically represents a turbojet TB comprising a device for measuring the static pressure at the outlet S from the high pressure compressor CMP. To simplify the description, this pressure is referred to as PS3 in the remainder of the text. As shown in FIG. 1, the turbojet TB comprises particularly a computer CT and a duct CNL that transfers air from the outlet S of the HP compressor CMP to the computer CT. A pressure unit within the computer CT is used to measure and convert the air pressure routed through a pressure sensor CP. This information is then used for engine control and for troubleshooting.

Experience shows a non-negligible number of incidents due to an incorrect PS3 pressure measurement, for example slower acceleration than normal, loss of thrust or impossibility of reaching the requested thrust. These incidents usually occur when the aircraft demands high thrust, in other words during takeoff, during the climbing or approach phase and can lead to the crew deliberately stop the turbojet.

Therefore the pressure sensor CP is usually made redundant, to make the measurement more reliable. Two pressure sensors CP1, CP2 then measure the routed air pressure, and it is checked that the interval between the two measurements is not too large. If measurements are divergent, the two values are compared with a theoretical value of the pressure PS3 determined using a model implemented in the computer CT, so that the position of the pressure sensor can be identified.

However, although this test is suitable for detecting a malfunction of a sensor, it cannot help to detect a defect on a duct. A large number of defects can be observed on the duct, particularly:

A loose connection of the duct to the computer, frequently after washing of the turbojet during which the duct was removed Presence of ice or water at the connection of the duct to the computer Presence of ice or water within the duct Perforations in the duct, for example due to recurrent friction with surrounding systems.

All these defects will cause an underestimate of the pressure PS3. For example, a blocked or perforated duct will cause a head loss reducing the pressure experienced by the sensor downstream from the defect. The leakage flow depends on the static pressure at the outlet from the HP compressor, and the area of the leak. The escaping air flow increases with increasing pressure PS3 and with increasing size of the defect. The head loss also depends on the leakage flow. Therefore the head loss is greater when the defect is pronounced and/or the pressure PS3 is high.

At the present time, the only way that a defect in the duct can be detected is for a maintenance operator to make a visual inspection of the duct, either by chance during a maintenance operation or intentionally following an incident (deliberate or unintentional stop of the turbojet in flight, loss of thrust, impossible to start, etc.).

GENERAL DESCRIPTION OF THE INVENTION

The invention provides a solution to the problems mentioned above, by proposing a method of assisting with the detection of damage to the duct in question.

Therefore, a first aspect of the invention relates to a method for assisting with the detection of damage to a duct, said duct being designed to convey a pressurised air flow collected at the outlet of a high pressure compressor of a turbine engine to a first pressure sensor and a second pressure sensor of a computer.

The method comprises the following steps:

Step A: Measure a first air pressure at the first pressure sensor

Step B: Measure a second air pressure at the second pressure sensor

Step C: Determine a theoretical aft flow pressure at the outlet from the high pressure compressor;

Step D: Make a first test of the difference including the following sub-steps:

Calculate a first value equal to the difference between the theoretical pressure and the first pressure Compare the first value with a threshold, the first difference test being positive if the first value is higher than the threshold, otherwise negative Step E: Make a second test of the difference including the following sub-steps:

Calculate a second value equal to the difference between the theoretical pressure and the second pressure Compare the second value with the threshold, the second difference test being positive if the second value is higher than the threshold, otherwise negative Step F: Make a final test, which is positive if the first difference test and the second difference test are positive, and negative otherwise.

If the final test is positive, it can be presumed that there is a defect in the duct. In other words, a positive final test carries a strong presumption that the duct is damaged. A visual inspection can then be made to confirm that the duct is actually damaged.

Apart from the characteristics that have just been mentioned in the previous paragraph, the method according to the invention can have one or several complementary characteristics among the following, taken individually or in any technically possible combination:

Thus, in on one non-limitative embodiment, step A and step B are done practically simultaneously. This means that the interval between the two pressure measurements is not longer than the period of the computer.

In one embodiment, the steps A, B, C, D, E and F are repeated, for example periodically. This can provide confirmation that there is a defect in the duct.

In one embodiment, the interval at which steps A, B, C, D, E and F are repeated, is approximately equal to the period of the computer. In other words, a final test is performed during each period of the computer. This helps with fast detection of a defect in the duct. In another embodiment, the final tests are made at longer intervals. This can reduce the volume of calculations made in the computer.

In one preferred embodiment, the method includes a step H to trigger an alarm after N successive positive final tests performed, where N is a positive integer number. It is considered that after N positive tests, there really is a defect in the duct.

In one embodiment, the method includes a step I to adjust the threshold value as a function of the theoretical air flow pressure. For example, the threshold is a percentage of the theoretical pressure. Step I is done after step C.

In one preferred embodiment, the threshold value is adjusted to the maximum value between 10 psi (pounds per square inch) and 5% of the theoretical air flow pressure.

According to a second aspect, the invention relates to a computer program comprising an instruction set that, when executed on a computer, causes implementation of a method according to the first aspect of the invention.

The invention and its different applications will be better understood after reading the following description and examining the accompanying figures.

BRIEF DESCRIPTION OF THE FIGURES

The figures are presented for information only and are in no way limitative to the invention. The figures show.

DETAILED DESCRIPTION OF AT LEAST ONE EMBODIMENT OF THE INVENTION

Figure 1:
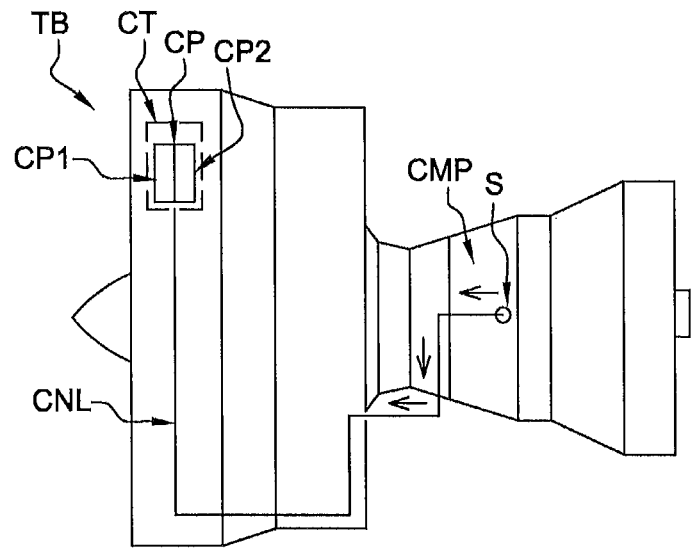
FIG. 1, already described, a diagrammatic view of a turbojet comprising a device for measuring the static pressure at the outlet from the HP compressor of said turbojet.

The method disclosed by this invention is intended for use within a turbojet TB like that described above with reference to FIG. 1. The turbojet TB thus comprises a high pressure compressor CMP, a computer CT and a duct CNL to connect the computer CT to an outlet S from the high pressure compressor CMP.

The computer CT comprises a first pressure sensor CP1 and a second pressure sensor CP2. The duct CNL is designed to route a pressurised air flow collected at the outlet S from the high pressure compressor CMP to the first pressure sensor CP1 and to the second pressure sensor CP2.

The method makes use of the idea that a defect on the duct CNL influences the measurements made by the two pressure sensors CP1, CP2 because the duct CNL is an element common to the PS3 pressure measurement system.

Figure 2:
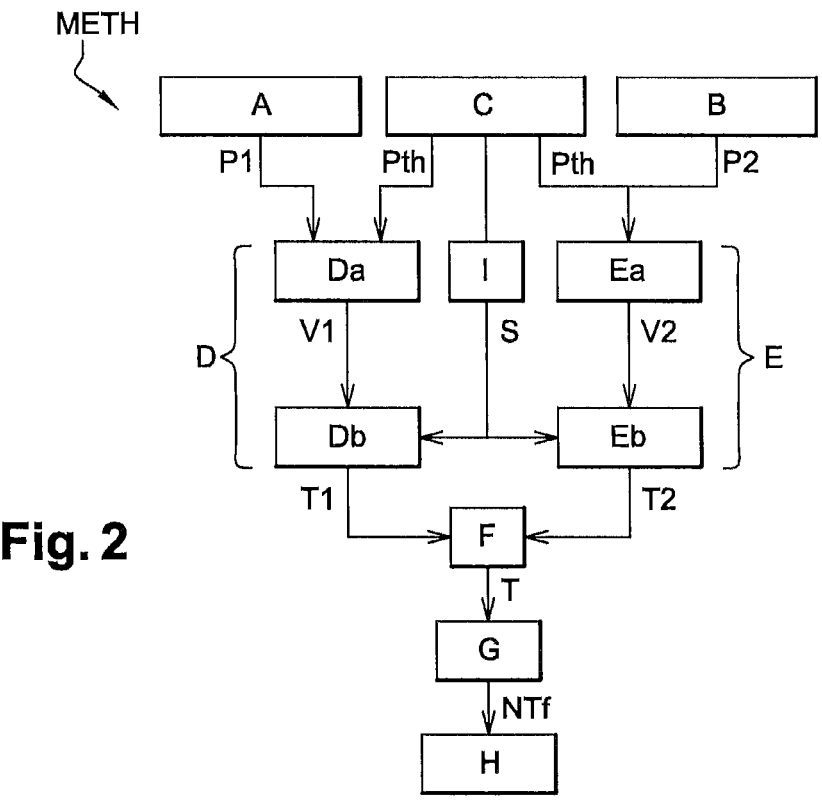
FIG. 2, a diagrammatic view of a method according to a first embodiment of the invention.

FIG. 2 is a diagrammatic view of a method METH according to one embodiment of the invention. The method METH comprises the following steps:

Step A: Measure a first air pressure P1 at the first pressure sensor CP1;

Step B: Measure a second air pressure P2 at the second pressure sensor CP2; The two pressure measurements P1, P2 are made in real time and practically simultaneously. Practically simultaneously means that if the computer CT is operating at frequency f, then the two pressure measurements P1, P2 are both made during the time period 1/f.

Step C: Determine (estimate) a theoretical pressure Pth of the air flow at the outlet S from the high pressure compressor CMP; A model implemented in the computer CT is used to calculate this theoretical value Pth in real time. Details of the implementation of this model form part of prior art are therefore not described herein. Note that the value of the theoretical pressure Pth can be used outside the context of the method according to the invention to detect when one of the pressure sensors is detective, as explained in the "Technological background of the invention" part.

Step I: Calculate a threshold value S as a function of the theoretical pressure Pth of the air flow. Ideally, for CFM56-7B type turbojets, the threshold is adjusted to be approximately equal to 10 psi (pounds per square inch) which is about 0.7 bars, or 5% of the theoretical value Pth, whichever is the greater. Thus, if the theoretical pressure Pth is equal to 30 psi, then the threshold value S is equal to 10 psi. If the theoretical pressure Pth is equal to 300 psi, then the threshold value S is equal to 15 psi.

Step D: Make a first difference test T1 including the following sub-steps:

Sub-step Da: Calculate a first value V1 equal to the difference between the theoretical pressure Pth and the first pressure P1

Sub-step Db: Compare the first value V1 with a threshold S, the first difference test T1 being positive if the first value V1 is higher than the threshold S, otherwise negative Step E: Make a second difference test T2 including the following sub-steps:

Sub-step Ea: Calculate a second value V2 equal to the difference between the theoretical pressure Pth and the second pressure P2

Sub-step Eb: Compare the second value V2 with the threshold S, the second difference test T2 being positive if the second value V2 is higher than the threshold S, otherwise negative Step F: Make a final test Tf, that is positive if the first difference test T1 and the second difference test T2 are positive, and negative otherwise.

Step G: Steps A to F are then repeated until an order to stop the process is received, or for a determined duration, or for a determined number of times. Steps A to F are advantageously done periodically, ideally at a frequency f equivalent to the frequency of the computer CT.

Step H: Trigger an alarm after N successive positive final tests Tf, where N is a positive integer number. Traditionally, an alarm is triggered if the final tests Tf are positive for 4.8 seconds. If the final tests Tf are done at a frequency of 15 milliseconds (which is traditionally the order of magnitude of the frequency of a computer), an alarm will be triggered after N=320 occurrences of positive final tests Tf. However, it may be desirable to reduce the frequency of occurrences due to the capacity of the computer CT installed in the turbine engine TB, to relieve the work done by the computer CT. For example, if the final tests Tf are done at a frequency of 120 milliseconds, an alarm will be triggered after N=40 occurrences of positive final tests Tf. It will be noted that since the failure being searched for is physical (for example a leak in the pipe) and not electrical, the acquisition frequency does not need to be so high, without reducing the reliability of the method METH.

The alarm is triggered by sending failure information from the computer CT to a maintenance system. The maintenance system then decides whether or not the alarm should be displayed in the cockpit, depending on the severity of the failure. Since measurement of the pressure PS3 is essential for control of the turbine engine TB, the failure is signalled in the cockpit in the form of an orange alarm, indicating a problem in the regulation system of the turbine engine TB.

Thus according to the described method METH, a "PS3 duct failure" is set if the final tests Tf are simultaneously positive on the two local channels corresponding to the two pressure measurements for a determined duration.

Note that:
The method METH cannot detect a defect on the duct CNL when the turbine engine TB is not running, because the pressure PS3 is equal to the ambient pressure.
Once the turbine engine TB is started, the pressure loss caused by damage to the duct CNL will be more or less visible depending on the thrust from the turbine engine:
Thrust is minimal when idling on the ground, and consequently the pressure PS3 is also minimal. Depending on the severity of the damage, the pressure loss may be low and thus more difficult to detect.
The pressure loss becomes higher and the defect becomes easier to detect as the demand thrust increases.

Note also that the smallest detectable pressure loss is directly related to the precision of the model used to calculate the theoretical pressure Pth, and the precision of the acquisition system of pressures P1, P2. Typically, this precision depends on the measured pressures P1, P2, the precision degrading with the pressure increase. Therefore the threshold value S can be adjusted to be lower if the model precision and the measurement precision are higher.

The invention claimed is:

1. A method for assisting with a detection of damage to a duct, the duct including an air flow conduit configured to convey a pressurized air flow collected at an outlet of a high pressure compressor of a turbine engine to a first pressure sensor and a second pressure sensor of a computer, the method comprising:
   (A) measuring a first air pressure at the first pressure sensor;
   (B) measuring a second air pressure at the second pressure sensor;
   (C) determining a theoretical air flow pressure at the outlet of the high pressure compressor;
   (D) performing a first difference test including the following sub-steps:
      (Da) calculating a first value equal to a difference between the theoretical air flow pressure and the first air pressure,
      (Db) comparing the first value with a threshold, the first difference test being positive if the first value is higher than the threshold, the first difference test being negative if the first value is lower than the threshold;
   (E) performing a second difference test including the following sub-steps:
      (Ea) calculating a second value equal to a difference between the theoretical air flow pressure and the second pressure,
      (Eb) comparing the second value with the threshold, the second difference test being positive if the second value is higher than the threshold, the second difference test being negative if the second value is lower than the threshold; and
   (F) Perform performing a final test, which is positive if the first difference test and the second difference test are positive, and which is negative if the first difference test or the second difference test, or both the first and the second difference test, are negative.

2. The method according to claim 1, wherein step (A) to measure the first air pressure and step (B) to measure the second air pressure, are done practically simultaneously.

3. The method according to claim 1, wherein steps (A) to (F) are done periodically.

4. The method according to claim 3, wherein an occurrence period of steps (A) to (F) is approximately equal to a period of the computer.

5. The method according to claim 3, further comprising triggering an alarm after N successive positive final tests are performed, where N is a positive integer number.

6. The method according to claim 1, further comprising adjusting the threshold as a function of the determined theoretical air flow pressure.

7. The method according to claim 6, wherein the threshold is adjusted to a maximum value between 10 psi (pounds per square inch) and 5% of the theoretical air flow pressure.

8. A non-transitory computer readable medium comprising an instruction set that, when executed on a computer, causes implementation of a method according to claim 1.

* * * * *